United States Patent [19]

Kimura et al.

[11] Patent Number: 5,747,627
[45] Date of Patent: May 5, 1998

[54] ROOM TEMPERATURE CURING POLYURETHANE COMPOSITIONS

[75] Inventors: Kazushi Kimura; Toshimitsu Takeda; Hiroyuki Hosoda; Kazunori Ishikawa; Hiroyuki Okuhira, all of Hiratsuka, Japan

[73] Assignee: The Yokohama Rubber Co., Ltd., Tokyo, Japan

[21] Appl. No.: 693,056

[22] PCT Filed: Dec. 26, 1995

[86] PCT No.: PCT/JP95/02684

§ 371 Date: Aug. 19, 1996

§ 102(e) Date: Aug. 19, 1996

[87] PCT Pub. No.: WO96/20231

PCT Pub. Date: Jul. 4, 1996

[30] Foreign Application Priority Data

| Dec. 27, 1994 | [JP] | Japan | 6-326153 |
| Dec. 27, 1994 | [JP] | Japan | 6-326154 |
| May 17, 1995 | [JP] | Japan | 7-118678 |
| Jul. 17, 1995 | [JP] | Japan | 7-180040 |
| Aug. 29, 1995 | [JP] | Japan | 7-220113 |
| Oct. 20, 1995 | [JP] | Japan | 7-272370 |

[51] Int. Cl.$^6$ .......................... C08G 18/16; C08G 18/22; C08G 18/32; C08G 18/38
[52] U.S. Cl. .................. 528/59; 525/452; 525/453; 525/454; 525/457; 525/460; 528/27; 528/28; 528/48; 528/52; 528/55; 528/69; 528/73
[58] Field of Search ...................... 525/452, 453, 525/454, 460, 457; 528/48, 52, 55, 73, 27, 28, 59, 69

[56] References Cited

U.S. PATENT DOCUMENTS

| 3,661,923 | 5/1972 | Emmons et al. | 548/215 |
| 3,743,626 | 7/1973 | Emmoms et al. | 428/355 |
| 3,933,699 | 1/1976 | Kan et al. | 521/115 |
| 4,138,545 | 2/1979 | Emmoms et al. | 528/289 |
| 4,504,647 | 3/1985 | Zabel et al. | 528/68 |
| 4,879,365 | 11/1989 | Petschke et al. | 528/49 |
| 4,910,242 | 3/1990 | Podola et al. | 524/158 |
| 5,126,421 | 6/1992 | Majewski et al. | 528/44 |
| 5,219,979 | 6/1993 | Greco | 528/220 |
| 5,286,787 | 2/1994 | Podola et al. | 524/773 |
| 5,412,056 | 5/1995 | Zwiener et al. | 528/73 |
| 5,603,798 | 2/1997 | Bhat | 528/73 |

*Primary Examiner*—Rabon Sergent
*Attorney, Agent, or Firm*—Finnegan, Henderson, Farabow, Garrett & Dunner, L.L.P.

[57] ABSTRACT

A room temperature curing polyurethane composition comprises a polyisocyanate compound or polyurethane prepolymer (A), an oxazolidine compound (B) having at least one oxazolidine ring, a compound (C) for accelerating the opening of the oxazolidine ring, and optionally a modified carbodiimide (D). The inventive polyurethane composition excels in storage stability and freedom of foaming when curing.

5 Claims, No Drawings

ROOM TEMPERATURE CURING POLYURETHANE COMPOSITIONS

[FIELD OF THE INVENTION]

This invention relates to room temperature curing polyurethane compositions useful as polyurethane resin-based adhesives, coatings, sealants, primers and the like.

[PRIOR ART]

Polyurethane is curable with moisture at room temperature and has excellent properties including resiliency and adhesiveness such that may find effective use as sealants, water-proofing agents, adhesives and the like. Polyurethane-based sealants are classified into one-pack and two-pack types of formulation. A two-pack sealant needs to be admixed uniformly with a curing agent prior to use, which advantageously would require a relatively short length of time but would be somewhat tedious as it is done at the site of application. Whereas, a one-pack type of sealant can dispense with prior mixing with other components and is easy to handle, thus leading to increased demand.

One-pack polyurethane compositions are primarily moisture-curable and curable with moisture in the air or moisture adsorbed to a blended compound. Such crosslinking curing progresses from the surface toward the interior of the composition with the results that it will take prolonged length of time before the composition is completely cured. Thus, one-pack compositions compared to two-pack counterparts are less curable and have the problem of storage stability due to initiation of curing upon reaction with moisture in the air or moisture adsorbed to their components.

Known as moisture curing potential agents are oxazolidine, ketimine, enamine and thiosilyl compounds, of which oxazolidine compounds are particularly preferred in terms of balanced curing ability and storage stability as well as satisfactory quality of their cured products. (Japanese Patent Publication No. 55-35407, No. 58-5913 and No. 58-5914). Attempts have been made to control the rate of ring opening (activation) of the oxazolidine ring by changing the 2-position carbon substituents.

Japanese Laid-Open Patent Publication No. 2-55715 discloses a one-pack urethane composition comprising an isocyanate prepolymer added with an oxazolidine compound having two oxazolidine rings and an aromatic polyfunctional isocyanate. This composition is disclosed to be good in respect of storage stability, but is not in fact good enough.

Acids such as 2-ethylhexane are known for accelerating the opening of the oxazolidine ring, but such acids in the preparation of one-pack urethane compositions tend to react with urethane, leading to reduced storage stability. Such acids in the case of two-pack urethane compositions would react with isocyanate, resulting in foaming. Thus, with urethane prepolymers having isocyanate terminal groups, there remain air bubbles in the resulting cured product which emanate from excessive carbon dioxide gas upon reaction of the isocyanate groups with moisture. This problem may be solved by adding ketimine, aldimine or enamine to the urethane prepolymer as disclosed in Japanese Patent Publication Nos. 62-9155 and 4-27962 and Japanese Laid-Open Disclosure Nos. 4-226522 and 5-8730. The disclosed methods may be highly effective in foam suppression, but have a drawback in that the compositions thereby produced are susceptible to viscosity increase over a prolonged period of storage. To provide enhanced curability, it has been proposed [J. Coatings Technology, 49,631 (1977)] to use hydrogen chloride or tin (IV) or organic compounds of tin and lead, or tertiary amine and like curing catalysts. Hydrogen chloride is malodorous and corrosive to clothing. Tin (IV) compounds are usually very stable in storage.

The present inventors have proposed as in Japanese Laid-Open Disclosure No. 7-138336 to use a urethane composition containing a urethane prepolymer, an oxazolidine compound, a silyl ester compound and a monoisocyanate compound. This composition is characterized by the use of a monoisocyanate compound to trap moisture in the system, opening-ring oxazolidine compounds or free acids. Monoisocyanates are however not always useful for improvement in storage stability and sometimes liable to gelation.

[DESCRIPTION OF THE INVENTION]

It is an object of the invention to provide a curable composition containing an oxazolidine compound as a potential curing agent and capable of controlling the rate and degree of ring opening of the oxazolidine ring and suppressing foams during storage or in use.

By suitably controlling the curing conditions, there may be obtained a room temperature curing urethane composition, whether one-pack or two-pack type, which can be tailored to application as adhesives, primers, coatings, sealants and the like.

According to the invention, there is provided a room temperature curing polyurethane composition which comprises (A) polyisocyanate compound or polyurethane prepolymer, (B) oxazolidine compound having at least one oxazolidine ring and (C) compound for accelerating the opening of the oxazolidine ring.

According to the invention, there is also provided a room temperature curing polyurethane composition which further incorporates (D) carbodiiomide modified carbodiimide.

There may be used as component (B), a product of reaction between a polyisocyanate compound or a urethane prepolymer of organic isocyanates and polyols and N-hydroxylalkyloxazolidine.

Component (C) may be at least one of compounds of the following groups (e), (f) and (g) and may be used singly or in combination.

Group (e): hydrolytic ester compounds such as orthoformic acid ester and organosilicic acid ester Group (f): mixtures or adducts of p-toluene sulfonyl isocyanate and oxygen-containing organic compound or sulfur compound Group (g): organic bismuth compounds Component (A) of the inventive composition; i.e., polyisocyanate compound or urethane prepolymer is a compound having an isocyanate group portion undergoing a urea-bond formation to crosslink or harden into a polymer. Polyisocyanate compounds may be those used in the production of polyurethane resins and exemplarily includes 2,4-tolylenediisocyanate, 2,6-tolylenediisocyanate, diphenylmethane-4,4-diisocyanate and modifications thereof, 1,5-naphthalenediisocyanate, tolidineisocyanate, hexamethylenediisocyanate, isophoronediisocyanate, xylylenediisocyanate and the like. These may be used singly or in combination.

Eligible urethane prepolymers as component (A) may be those which are derivable from the reaction of polyols and polyisocyanates. The term polyols as used herein designates all kinds of alcohol having a plurality of hydrogen atoms in the hydrocarbon substituted by hydroxyl groups and resulting from addition reaction of one or more alkylene oxides such as ethylene oxide, propylene oxide, butylene oxide and tetrahydrofuran with compounds having two or more active hydrogen atoms. The latter compounds exemplarily include polyhydric alcohols such as ethyleneglycol, propyleneglycol, butanediol, diethylglycol, glycerin, hexanetriol, trimethylolpropane and pentaerythritol; amines such as ethylenediamine and hexamethylenediamine; alkanol amines such as ethanolamine and propanolamine; and polyhydric phenols such as resorcin and bisphenol.

The polyols used in the invention include polyolefin-based polyol such as polytetramethyleneglycol, polyethyleneglycol, polypropyleneglycol, polyoxypropyleneglycol, polyoxybutyleneglycol, polyether-based polyol, polybutadienepolypolyol and polyisoprenepolyol; polyester-based polyol such as adipate-based polyol, lactone-based polyol and castor oil; and if necessary these may be used in combination. These polyols have a weight average molecular weight of preferably 100–10,000, more preferably 500–7,000.

In the production of urethane prepolymers, there are used a polyol and a polyisocyanate in a ratio of less than one hydroxyl group in the polyol to one isocyanate group in the polyisocyanate, preferably 0.95–0.75. Urethane prepolymers may be prepared under conditions known in the art; that is, by reacting a hydroxyl compound with a polyisocyanate at a temperature of 50°–100° C. and under atomospheric pressure.

Component (B) used in the invention; i.e., an oxazolidine compound having at least one oxazolidine ring (saturated 5-member ring containing oxygen and nitrogen) undergoes ring-opening in the presence of moisture (water) and hardens upon reaction with the isocyanate group in Component (A). Examples of such oxazolidine compound include a N-hydroxyalkyl oxazolidine and a polyisocyanate adduct thereof, an oxazolidilinesily ether, a carbonate oxazolidine and an ester oxazolidine.

N-hydroxyalkyl oxazolidines are derivable from dehydrogenative condensation of an alkanol amine and a ketone or an aldehyde and exemplarily include 2-isopropyl-3-(2-hydroxyethyl)oxazolidine (hereinafter referred as hydroxyalkyloxazolidine (1)), 2-(1-methylbutyl)-3-(2-hydroxyethyl) oxazolidine (hereinafter referred as hydroxyalkyloxazolidine (2)), 2-phenyl-3-(2-hydroxyethyl) oxazolidine (hereinafter referred as hydroxyalkyloxazolidine (3)), 2-(p-methoxyphenyl)-3-(2-hydroxyethyl) oxazolidine (hereinafter referred as hydroxyalkyloxazolidine (4)) and 2-(2-methylbutyl)-3-(2-hydroxyethyl)-5-methyloxazolidine (hereinafter referred as hydroxyalkyloxazolidine (5)).

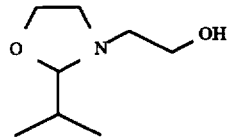

hydroxyalkyl-oxazolidine (1)

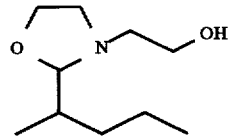

hydroxyalkyl-oxazolidine (2)

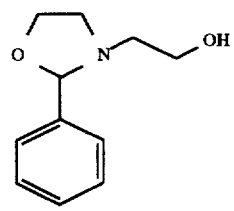

hydroxyalkyl-oxazolidine (3)

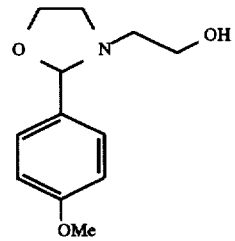

hydroxyalkyl-oxazolidine (4)

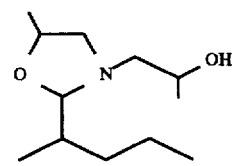

hydroxyalkyl-oxazolidine (5)

Oxazolidinesilyl ether can be prepared by reacting the above N-hydroxyalkyloxazolidine with an alkoxysilane such as trimethoxysilane, tetramethoxysilane, triethoxysilane, dimethoxydimethylsilane, vinyltrimethoxysilane, vinyltriethoxysilane, γ-glycidoxypropyltrimethoxysilane and γ-glycidoxypropyltriethoxysilane.

This reaction is effected in the presence of a catalyst such as titanium alcoxide, aluminum alcoxide or divalent Sn at a temperature of 40°–160° C., preferably 80°–140° C.

The above oxazolidinesily ether is specifically as follows:

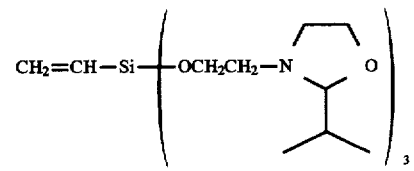

oxazolidinesily ether (1)

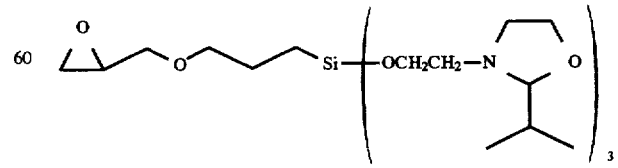

oxazolidinesily ether (2)

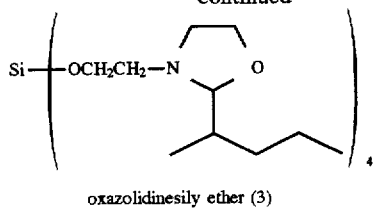

oxazolidinesily ether (3)

The carbonate oxazolidine referred to herein may be one disclosed for example in Japanese Laid-Open Disclosure No. 5-117252 and can be prepared by reacting for example the hydroxyalkyl oxazolidine (1) with a carbonate such as diallyl carbonate, dimethyl carbonate and dipropylene carbonate with use of a polyvalent alcohol such as diethylene glycol and glycerin. This reaction is effected in the presence of an ester-exchange catalyst such as sodium methylate at a temperature of 60°–160° C., preferably 100°–140° C. The catalyst is used in an amount of preferably between 50 and 1,000 ppm based on the total amount of N-hydroxyalkyl oxazolidine, carbonate and polyvalent alcohol. The thus obtained carbonate oxazolidine may be represented by the formula

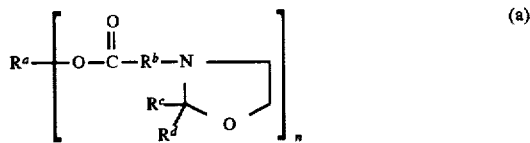

(wherein n is an integer of 1–10, $R^a$ and $R^b$ each are a $C_1$–$C_8$ organic group, Rc and Rd each are hydrogen or a $C_1$–$C_8$ organic group.)

A specific example of the compound (a) above is as follows:

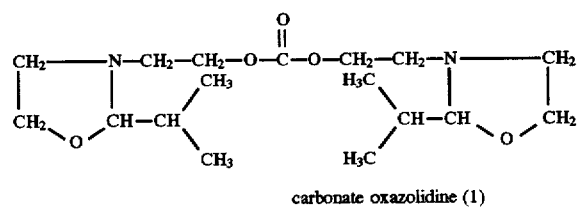

carbonate oxazolidine (1)

The ester oxazolidine referred to herein may be one disclosed for example in U.S. Pat. No. 3,661,923 and U.S. Pat. No. 4,138,545 and can be prepared by reacting the above hydroxyalkyl oxazolidine (1) with a lower alkyl ether of dicarbonic acid or polycarbonic acid. Examples eligible for the purpose of the invention are as follows:

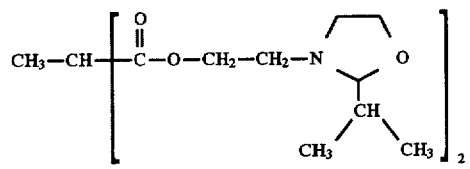

ester oxazolidine (1)

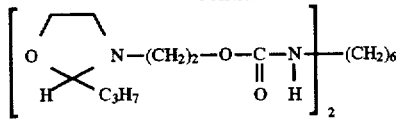

ester oxazolidine (2)

The above oxazolidine (2) is made available under the tradename of Hardener-OZ by Bayer.

These oxazolidine compounds (B) are used in an amount of between 1 and 20, preferably 2 and 10 parts by weight per 100 parts by weight of urethane prepolymer (A) in consideration of a balanced quality of storage stability and curability.

Component (B) used in the invention may be an oxazolidine compound having more than three oxazolidine rings in the molecule and can be synthesized by reacting N-hydroxyalkyl oxazolidine of the formula (b) with a polyisocyanate compound

wherein $R^1$ is a $C_2$–$C_3$ straight or branched divalent aliphatic hydrocarbon group such as alkylene, alkenylene and alkynylene, and $R_2$ and $R_3$ each are hydrogen or a $C_1$–$C_{20}$ monovalent hydrocarbon group.

Oxazolidines of the formula (b) may be synthesized from corresponding aldehyde or ketone and N-hydroxyalkyl amine in a well known manner.

The aldehyde just referred to exemplarily includes aliphatic aldehyde such as formaldehyde, acetaldehyde, propionaldehyde, butylaldehyde, isobutyaldehyde, valeraldehyde, 2-methylbutylaldehyde, 3-methylbutylaldehyde, nexylaldehyde, 2-methylpentylaldehyde, octylaldehyde and 3,5,5-trimethylhexylaldehyde; and aromatic aldehyde such as benzaldehyde, methylbenzaldehyde, trimethylbenzaldehyde, ethylbenzaldehyde, isopropylbenzaldehyde, isobutylbenzaldehyde, methoxybenzaldehyde, dimethoxybenzaldehyde and trimethoxybenzaldehyde. The ketone exemplarily includes acetone, methylethylketone, methylpropylketone, methylsiopropylketone, diethylketone, methylbutylketone, methylisobutylketone, methyl-t-butylketone, diisobutylketone, cyclopentanone and cyclohexanone.

The aforesaid N-hydroxyalkyl amine preferably includes bis-N-(2-hydroxyethyl)amine, bis-N-(2-hydroxypropyl)amine and N-(2-hydroxyethyl)-N-(2-hydroxypropyl)amine.

The above aldehyde or ketone and N-hydroxyalkyl amine reaction takes place with an equivalent mol of nitrogen corresponding to the number of mols of aldehyde and ketone. However, aldehyde or ketone should preferably be used in increased amounts such as in the range of 1.01–1.5, particularly preferably 1.01–1.1, the reason being that unreacted N-hydroxyalkyl amine is difficult to separate from the resulting product and liable to reaction with isocyanates, leading to reduced storage stability. The reaction is preferably carried out with a solvent such as toluene and xylene under reflux conditions for 6–24 hours, preferably 8–12 hours. Reaction time lengths shorter than 6 hours would result in incomplete reaction and longer than 24 hours would result with the resulting reaction mixture being objectionably colored. The reaction is desiroubly effected in normal atmosphere. Upon completion of the reaction, excess aldehyde or ketone should be removed by vacuum distillation thereby to produce N-hydroxyalkyl oxazolidines of the formula (b).

The polyisocyanate compound under contemplation is an organic acid-containing polyisocyanate including a reaction product of polyhydric alcohols such as glycerin, hexane triol, trimethylolpropane and polypropylene glycol with paraphenylenediisocyanate, tolylenediisocyanate, tetramethylenediisocyanate, hexamethylenediisocyanate, xylenediisocyanate, octadecyldiisocyanate, naphthalenediisocyanate, 4,4'-diphenylmethanediisocyanate, isophoronediisocyanate or a modification thereof; or diisocyanate compounds such as tetramethylenediisocyanate and hexamethylenediisocyanate (HDI); wherein they are trimerized in the presence of catalyst so as to form an isocyanurate ring.

One or more of these polyisocyanates may be reacted with N-hydroxyalkyl oxazolidines of the formula (b) at a temperature of 50°–100° C. under atmospheric pressure whereby there is obtained an oxazolidine compound having more than three oxazolidine groups in the molecule. Solvents such as toluene and xylene may be used to reduce the viscosity. N-hydroxyalkyl oxazolidine and polyisocyanate compound are reacted in a ratio of one mol of hydroxyl group to one mol of polyisocyanate. Greater amounts of polyisocianate would result in an increase in unreacted organic polyisocyanates and poor curing when mixed with urethane prepolymer. Smaller amounts of polyisocyanate than one mol would result in increased unreacted N-hydroxyalkyl oxazolidine failing to act as a tri-functional crosslinking agent in the reaction mixture and thereby leading to declined curing ability.

Specific examples of the oxazolidine compounds having more than three oxazolidine rings in the molecule are as follows:

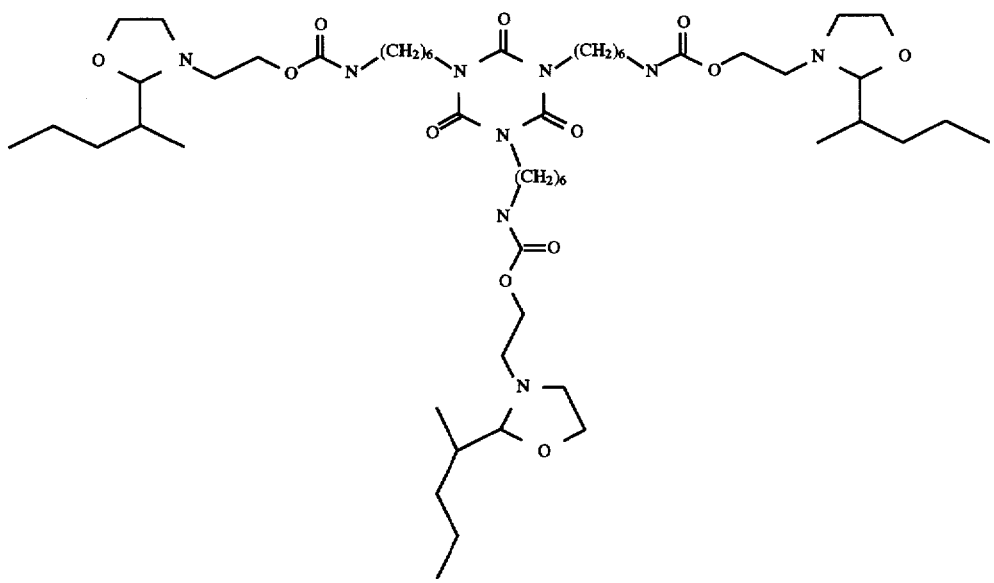

polyfunctional oxazolidine compound (1)

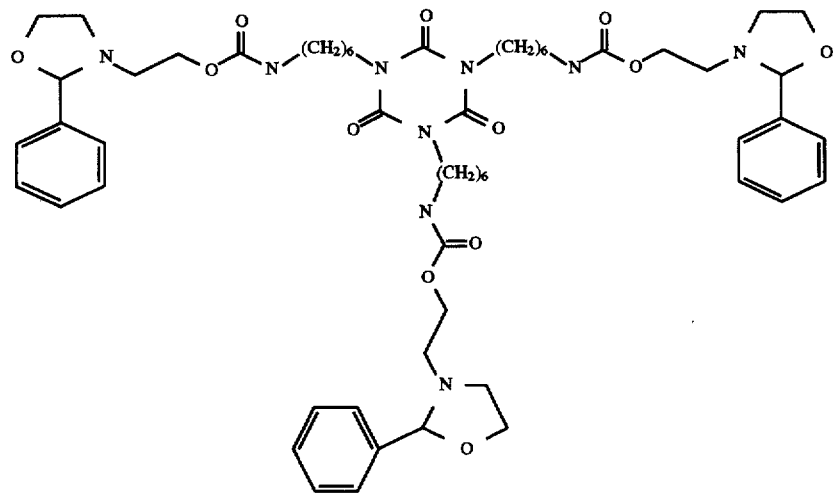

polyfunctional oxazolidine compound (2)

The above oxazolidine compounds contained in the inventive polyurethane composition should have a number of mols of oxazolidine rings in the curing agent 0.1–1.0, preferably 0.2–1.0 times the number of mols of NCO in 100 parts by weight of Component (A). Departures from this range would result in increased residual tack.

Particularly preferred as Component (B) of the inventive composition is an isocyanate oxazolidine compound of the formula

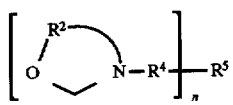

wherein $R^1$ is a $C_2$–$C_6$, preferably $C_2$–$C_3$, more preferably $C_2$ alkylene group; $R^2$ and $R^3$ each are hydrogen, $C_1$ or greater alkyl group, $C_5$–$C_7$ alicyclic alkyl group or $C_6$–$C_{10}$ aryl group; $R^4$ is $C_2$–$C_6$ alkylene group, aryl group, $C_2$–$C_6$, preferably $C_1$–$C_5$ urethane bond-containing alkylene or aryl group; $R^5$ is a group constituting the skeleton of isocyanate compound, preferably diisocyanate or triisocyanate derived by removal of an isocyanate from n-number polyisocyanates; and n is an integer of 1–4, preferably 2 or 3 in view of balanced tensile strength and elongation in tension, integers greater than 3 would result in too rigid and brittle product and smaller than 2 would mean incomplete curing.

The above compound is a potential curing agent having more than 2 functional groups to crosslink that undergoes ring-opening in contact with moisture in the air, producing imino and hydroxyl groups. Imino groups react with isocyanate groups to form a urea bond, while hydroxyl groups react with isocyanate groups to form a urethane bond thereby accelerating the curing.

The above isocyanate oxazolidine compound exemplarily includes TDI-based, MDI-based, XDI-based or HDI-based polyfunctioal oxazolidines of the formula

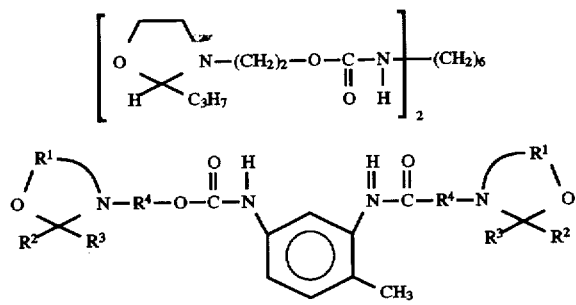

Some are available under the tradename of Hardener-OZ.
Other preferred isocyanate oxazolidine compounds are represented by the formula

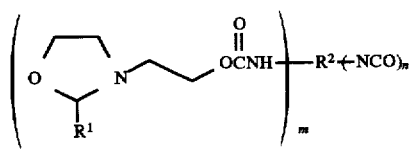

(d)

where $R^1$ is a $C_5$–$C_{15}$, preferably $C_5$–$C_{10}$ aliphatic hydrocarbon group such as n-pentyl, 2-methylpentyl, 3-methylpentyl, 3,5,5-trimethylpentyl, n-heptyl, n-ofctyl, n-nonyl, n-decanyl, n-undecanyl, n-dodecanyl, n-tridecanyl and n-tetradecanyl with the note that there are known oxazolidine compounds where $R^1$ is a $C_1$–$C_6$ alkyl group but there is no prior showing of preferences in carbon number attributable to potential curing ability; $R^2$ is an aromatic group such as trilene, diphenyl methane, phenylene, polymethylene and polyphenylene, an aliphatic group such as hexamethylene, an alicyclic group such as isophorone, an aromatic-aliphatic group such as xylene as well as their carbodiimido modified or isocyanate modified group; m is an integer of 1–6, preferably 2–3; n is an integer of 0–4, preferably 0–2.

If N-hydroxyethyl oxazolidines are not readily available for the preparation of isocyanate oxazolidine compounds of the formula (c), the following alternative procedures may be employed.

(a) reacting a diethanol amine with corresponding aldehyde to synthesize N-hydroxyethyl oxazolidine of the formula

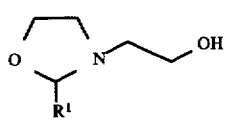

(b)

(where $R^1$ is a $C_5$ or greater aliphatic hydrocarbon)

(b) reacting the thus synthesized N-hydroxyethyl oxazolidine with an organic polyisocyanate.

Procedure (a) is effected at a temperature of 70°–150° C. in the presence of an organic solvent such as benzene, toluene and xylene. Thereafter, the reaction mixture is refluxed in an oil bath for 5–10 hours.

Procedure (b) is effected at a temperature of 60°–90° C. for 5–10 hours, the reaction temperature being subject to change as required.

The aldehyde used in Procedure (a) may be readily commercially available, including n-hexanal, 2-methylpentanal, 2-methylheptanal, n-octanal, 3,5,5-trimethylhexanal, n-decanal, n-undecanal, n-dodecanal, n-tridecanal, n-tetradecanal and n-pentadecanal.

The organic polyisocyanate used in the synthesis of the isocyanate oxazolidine compound may be aliphatic, alicyalic or aromatic, exemplarily including aromatic polyisocyanate such as 2,4-tolylenediisocyanate, 2,6-tolylenediisocyanate, 4,4'-diphenylmethanediisocyanate, 2,4'-diphenylmethanediisocyanate, p-phenylenediisocyanate and polymethylenepolyphenylenepolyisocyanate; aliphatic polyisocyanate such as hexamethylenediisocyanate; dicyclic polyisocyanate such as isophoronediisocyanate; aromatic aliphatic polyisocyanate such as xylenediisocyanate; and modified carbodiimide or isocyanurate modified polyisocyanate thereof.

Two or more of these isocyanates may be used in combination.

The thus obtained isocyanate oxazolidine compound may be adjusted in its physical properties in relation to Component (A) of the invention.

Another preferred example of Component (B) is an oxazolidinesilyl ether which may be derived from the reaction (i) of a hydroxyl group-containing oxazolidine with an alkoxysilane, or the reaction (ii) of a hydroxyl group-containing oxazolidine with a halogenated silyl compound. The reaction (i) is effected at 40°–160° C., preferably 80°–140° C. in the presence of a catalyst such as titanium alkoxide, aluminum alkoxide and a divalent tin compound ($Sn^{2+}$). The catalyst may be added as it is, or after being dissolved in a xylene or other suitable organic solvent, and the amount of its addition may be 0.01–5, preferably 0.1–2 parts by weight per 100 parts by weight of oxazolodine, taking into account the reaction time and the purity of the resulting product.

The oxazolidinesilyl ether used in the invention is of the formula

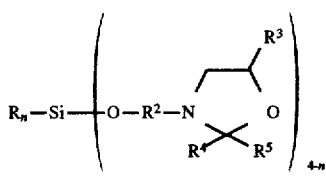

(i)

wherein n is an integer of 0–3; R is hydrogen, $C_1$–$C_{12}$ alkyl, alkoxyalkyl, alicyclic, alkoxy, acryloxyalkyl, aminoalkyl, mercaptoalkyl, vinyl, phenyl or amino group such as methyl, ethyl, vinyl, methacryloxypropyl, epoxycyclohexyl, glycidoxypropyl, aminoethyl, aminopropyl, phenyl, amino and mercaptopropyl groups; R may be the same or different if n is an integer of greater than 2; $R^2$ is a $C_2$ or $C_3$ alkyl group, preferably ethyl and isopropyl group; $R^3$ is hydrogen or methyl group; and $R^4$ and $R^5$ each are hydrogen or a $C_1$–$C_{20}$, preferably $C_3$–$C_{12}$ hydrocarbon group such as isopropyl, isopentyl, phenyl or specifically alkoxyphenyl such as methoxyphenyl, and either of $R^4$ and $R^5$ is preferably hydrogen in storage stability and curability terms.

Specific examples of eligible oxazolidine-silyl ether are as follows:

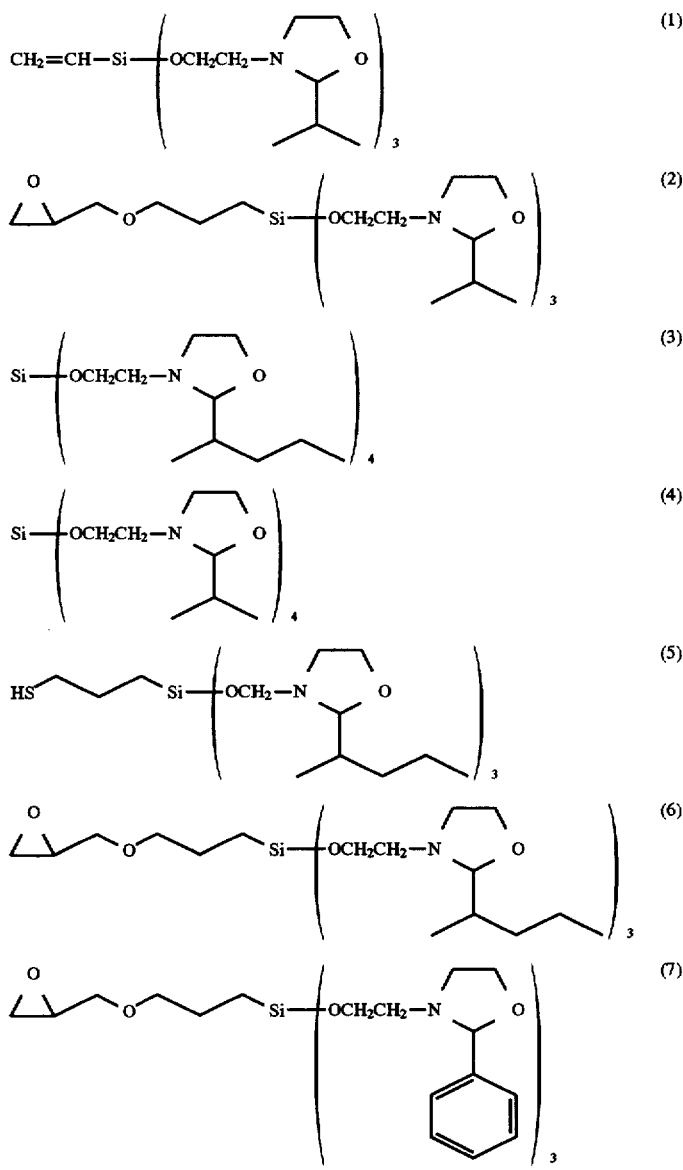

The ratio of the silyl ether group in Component (B) to the isocyanate group in Component (A); i.e. (Si—O)/NCO, is in the range of 1/1–1/30, preferably 1/2–1/20. Greater ratios of oxazolidinesilyl ether would result in insufficient curing, while smaller ratios of this ether would fail to achieve adequate foam suppression.

Component (C) of the inventive composition is a compound which is capable of hydrolytically inducing free acids upon contact with water (moisture) to accelerate the opening of the oxazolidine rings. Such a compound eligible for the purpose of the invention is generally classified into the following groups:

Group (e): hydrolylic ester compounds such as ortho-formic acid alkyl ester and organic silicic acid ester Group (f): mixtures or adducts of p-toluene sulfonyl isocyanates and oxygen-containing organic compound or sulfur-containing organic compound Group (g): organic bismuth compounds The ortho-formic acid alkyl ester in Group (e) may be ortho-formic acid methyl or ortho-formic acid ethyl and is used in an amount of 0.01–10, preferably 0.1–5 parts by weight per 100 parts by weight of polyisocyanate compound or urethane prepolymer (A). Larger amounts deviating from this range would cause free acids to react with isocyanates.

The organic silicic acid ester in Group (e) may be derived from carbonic acid and silanol and may be polymeric or momeric as represented by the formulae (j) and (k) below.

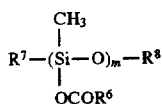
(j)

(where $R^6$ is a $C_1$–$C_{20}$ alkyl, aryl or aralkyl group; $R^7$ is a $C_1$–$C_5$, preferably $C_1$–$C_3$ alkoxy group; $R^8$ is a $C_1$–$C_5$ alkyl, aryl or aralkyl group; and m is an integer)

$$R^9{}_{4-n}Si(OCOR^{10})_n \quad (k)$$

(where $R^9$ is a $C_1$–$C_5$ alkyl, aryl or aralkyl group; $R^{10}$ is a $C_1$–$C_{20}$, preferably $C_2$–$C_3$ alkyl, aryl or aralkyl group; and n is an integer of 1–4)

The ester bond in the silicic acid ester breaks off upon reaction with water, releasing acids which are preferably acetic acid and propionic acid. The silicic acid ester is used in an amount of 0.01–10, preferably 0.1–5 parts by weight per 100 parts by weight of Component (A) so as to ensure freedom of reaction of free acids with isocyanates.

The p-toluene sulfonyl isocyanate in Group (f) is of the formula

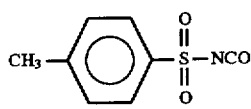
(m)

The above compound may be prepared with use of phosgene or by Hofmann reaction known for the synthesis of isocyanates and is commercially available under the tradename of Additive-TI of Sumitomo-Bayer Urethane Co.

The oxygen-containing or sulfur-containing organic compound in Group (f) may be used alone or in combination. The oxygen-containing organic compound is a compound having one or more oxygen atoms in the molecule which includes epoxys, esters, ethers, acetals, orthoesters, orthocarbonates, carbonates, alcohols and carbonic acids, of which esters, acetals and orthoesters are particularly preferred for storage stability. Eligible oxygen-containing organic compounds include methyl acetate, methyl formate, ethyl acetate, ethyl formate, methyl acrylate, dioctyl phthalate (DOP), diethylether, dioxane, tetrahydrofuran, phenylglycidylether, butylglycidylehter, ethyleneglycoldimethylether, propyleneglycol, polypropyleneglycol, methyl orthoformate, ethyl orthoformate, diethylacetal, 1,3-dioxirane, spiroorthochromatic carbonates such as shown in the following formula (n), bicycloorthochromatic ester, methanol, ethanol, propanol, butanol, pentanol, hexanol, heptanol, octanol, formic acid, acetic acid, propionic acid, octylic acid and stearic acid.

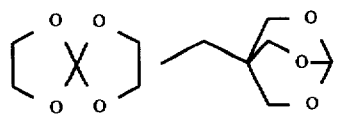
(n)

Formic acid methyl, acetic acid methyl, ortho-formic acid methyl and ortho-formic acid ethyl are particularly preferred to ensure good storage stability.

The sulfur-containing organic compound in Group (f) is a compound having one or more sulfur atoms in the molecule such as sulfides, thioacetals, thioketals, thioorthoesters, thioorthocarbonates and thiols. Eligble examples include diethyl sulfide, propylene sulfide, thiirane, tetrahydrothiophene, propanethiol and benzyl mercaptan. Especially tetrahydrothiophene, propylene sulfide and the like are preferred for storage stability.

Any of the Group (f) compounds is used in an amount of 0.1–20, preferably 0.5–5 parts by weight per 100 parts by weight of Component (A).

The adduct of p-toluene sulfonyl isocyanate and oxygen- or sulfur-containing organic compound is capable of accelerating the curing of the inventive composition upon contact with moisture at room temperature and is a sulfonamide derivative of the formula

(p)

where $R^1$ is a $C_1$–$C_{12}$ organic group such as methyl, ethyl, propyl, butyl, pentyl, hexyl, heptyl, phenyl, toluyl, p-toluyl and xylyl, of which methyl and p-toluyl groups are particularly preferred; $R^2$ is an organic group which may include nitrogen, sulfur, oxygen and silicon atoms and specifically embraces methyl, ethyl, propyl, propoxy, benzoly, cyanoethoxy, n-butylimino, chloroethoxy, dichloroethoxy and trichloroethoxy, of which cyanoethoxy and trichloroethoxy groups are particularly preferred.

Compounds of the above formula (p) exemplarily include sulfonamide compounds of the formulae

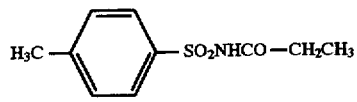

sulfonamide compound (1)

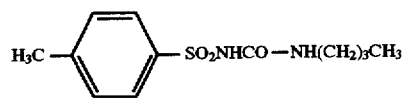

sulfonamide compound (2)

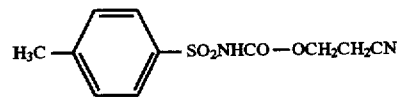

sulfonamide compound (3)

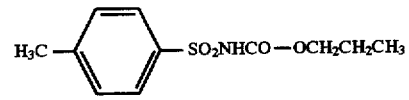

sulfonamide compound (4)

The compound (3) above is particularly preferred in terms of curability.

The sulfonamide derivative of the formula (p) may be derived from the reaction i) of an isocyanate compound of the formula (q) below with alcohol, mercaptan, amine, acid amide, silanol and the like which has an active hydrogen in the molecule, or from the reaction ii) of a sulfonamide of the formula (r) below with an acid halide.

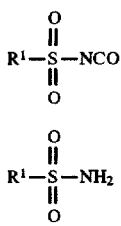

(q)

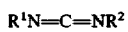

(r)

The isocyanate compound of the above formula (q) may be by way of example p-toluene sulfonyl isocyanate.

The alcohol referred to above exemplarily includes monool such as methanol, ethanol, propanol, n-propylalcohol, butanol, pentanol, hexanol, heptanol, octanol, ethylenecyanohydrin and trichloroethanol; and diol such as ethyleneglycol, propyleneglycol, 1,4-butanediol and polypropyleneglycol.

The mercaptan referred to above includes methanethiol, ethanethiol, propanethiol, benzylmercaptan, triethyleneglycoldimercaptan and polysulfide.

The amine referred to above includes ethylamine, propylamine, butylamine, n-butylamine, benzylamine, aniline and hexamethylenediamine.

The acid amide referred to above includes acetamide, propionamide and amidostearic acid.

The silanol referred to above includes trimethylsilanol and silanol terminal polydimethylsiloxane.

The compound (p) may be obtained by the reaction i) in which the sulfonylisocyanate compound (q) is reacted with an active hydrogen compound at a temperature of between $-10°$ C. and room temperature for a period of 10 minutes to 2 hours, the reactants being admixed such that the isocyanate group in the compound (q) become equivalent with the alcohol, mercaptan, amine, acid amide or silanol active group.

The sulfonamide derivative (p) may be obtained by the reaction ii), in which instance the sulfonamide compound (r) is exemplarily p-toluene sulfonamide and the acid halide is exemplarily acetylchloride,propionylchloride and benzoylchloride, the reaction being effected at 50°–100° C. for 2–10 hours such that the amino group in the sulfonamide compound become equivalent to the halogen in the acid halide.

The sulfonamide derivative (p) is added preferably in an amount of from 0.005 to 10 parts by weight per 100 parts by weight of Component (A). Amounts less than 0.005 weight parts would fail to achieve sufficient promotional effect, whilst amounts exceeding 10 weight parts would lead to aggravated storage stability.

Most of the amide derivatives (p) are crystalline and hence should be dissolved in solvents such as toluene, xylene, acetonitrile, methylethyl ketone, acetone and the like which may be added in an amount of 1–5 percent by weight.

The organic bismuth compounds Group (g), which may be typically represented by an organic bismuth carboxylate, are added in an amount of preferably from 0.001 to 5.0 parts by weight, more preferably from 0.1 to 2.0 parts by weight per 100 parts by weight of Component (A).

Component (D) is a carbodiimide or modified carbodiimide compound which is highly reactive with a nucleophilic reagent such as water, hydrogen sulfide, alcohol, thiol and ammonium and particularly with a carboxylic acid.

An example of Component (D) eligible for the purpose of the invention is a monocarbodiimide of the formula $$R^1N=C=NR^2$$

wherein $R^1$ and $R^2$ each are a $C_1$–$C_{10}$ alkyl group, an alicyclic alkyl group which may be substituted with an alkyl group, an alkyl group having a heterocycle which may be substituted with an alkyl group, and an aralkyl group which may be substituted, exemplarily including methyl group, ethyl group, propyl group, isopropyl group, butyl group, p-methylcyclohexane group, p-dicyclohexylenemethyl group, p-xylyl group, cyclohexyl group, morpholinoalkyl group, preferably cyclohexyl group and morpholinoethyl group.

A preferred specific example of the above monocarbodiimide compound is a dicyclohexyl carbodiimide (DDC), tradenamed Stabagzol I of the formula

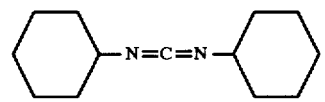

(s)

Another suitable example of Component (D) is a polycarbodiimide compound of the formula

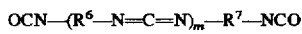

(t)

wherein $R^6$ and $R^7$ each are a $C_1$–$C_{10}$ alkylene group, an alicyclic alkylene group which may be substituted with an alkyl group, a heterocycle-containing alkylene group which may be substituted with an alkyl group, and an aralkyl group which may be substituted, specifically including methylene group, ethylene group, propylene group, isopropylene group, butylene group, p-methylenecyclohexane group, p-dicyclohexylenemethylene group, p-xylylene group, cyclohexylene group, morpholinoalkylene group, preferably cyclohexylene group and morpholinoethylene group, and m is an integer of 1–20, preferably 1–5.

The above compound (t) serves to capture moisture and carboxylic acid which affect storage stability of the system.

The polycarbodiimide is derivable from carbodiimidation of hydrogenated MDI and HDI, and further includes compounds of the formulae

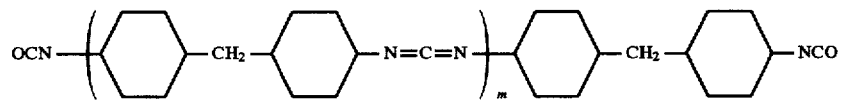

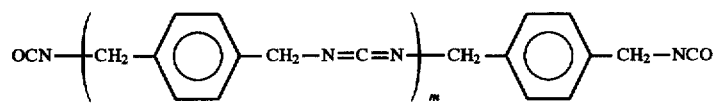

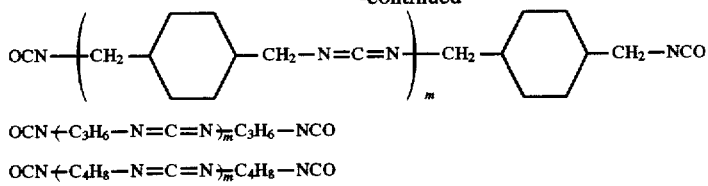

$$OCN\!-\!(\!-\!C_3H_6\!-\!N\!=\!C\!=\!N\!-\!)_m\!C_3H_6\!-\!NCO$$

$$OCN\!-\!(\!-\!C_4H_8\!-\!N\!=\!C\!=\!N\!-\!)_m\!C_4H_8\!-\!NCO$$

(wherein m is an integer of 1–20).

Polycarbodiimide compounds may be available from the carbodiimidation of aliphatic diisocyanates effected at elevated temperature or in the presence of a catalyst such as 3-methyl-1-phenyl-2-phosphorene-1-oxide at room temperature.

The aliphatic diisocyanate used in the above reaction exemplarity includes hexamethylenediisocyanate (HDI), isophoronediisocyanate (IPDI), hydrogenation MDI ($H_{12}$MDI) and xylylenediisocyanate (XDI). These diisocyanates are more readily reactive with moisture and carboxylic compounds than aromatic isocyanates and more conducive to storage stability of the system.

The polycarbodiimide compound is used in an amount of 0.1–10, preferably 1–4, parts by weight, per 100 parts by weight of the polyisocyanate or urethane polymer (A) to ensure storage stability.

Generally, one-pack urethane compositions contain such moisture or acids produced during the preparation of their components, or acids used as a catalyst which adversely affect storage stability. The polycarbodiimide compounds according to the invention serve as such a storage stabilizer which in the first place can trap moisture contained in the compounds of the system, the moisture tending to promote crosslinking between isocyanate groups and ring-opening and hence crosslinking of oxazolidine rings during storage, and in the second place can also trap free carboxylic acids which tend to promote crosslinking of oxazolidine rings during storage.

Component (D) used in the invention further includes a modified polycarbodiimide compound (bis-oxazolidine polycarbodiimide compound) of the formula wherein $R^6$ is a $C_1$–$C_{10}$ alkylene group, an alicyclic alkylene group which may be substituted with an alkyl group, a heterocycle-containing alkylene group which may be substituted with an alkyl group and an aralkyl group which may be substituted, $R^7$ is a $C_2$–$C_6$, preferably a $C_2$–$C_3$ alkylene group, $R^8$ and $R^9$ each are a hydrogen atom, a $C_1$ or greater alkyl group, a $C_5$–$C_7$ alicyclic alkyl group and a $C_6$–$C_{10}$ alkyl group, and m is an integer of 1–20, preferably 1–5, specifically including methylene group, ethylene group, propylene group, isopropylene group, butylene group, p-methylenecyclohexane group, p-dicyclohexylenemethylene group, p-xylylene group, cyclohexylene group, morpholinoalkylene group, preferably cyclohexylene group and morpholinoethylene group.

The above compound (D) serves to trap acids and moisture so as to provide improved storage stability of the composition.

The compound of formula (u) is capable of not only trapping moisture or carboxylic acids in the system but also hindering terminals with oxazolidine groups so as to hold the polymerization of polycarbodiimide to an initial degree and provide increased stability of itself. The presence of oxazolidine groups in the compound ensures freedom of bleeding.

A specific example of the bis-oxazolidine polycarbodiimide compound is represented by the formula

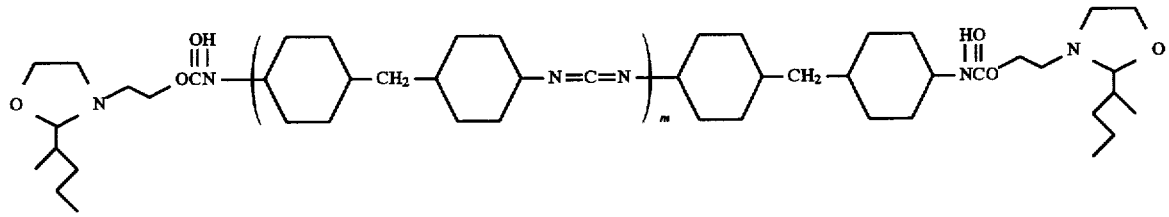

which is a polycarbodiimide (modified hydrogenated MDI) derived from hydrogenated MDI carbodiimide and terminally hindered with N-hydroxy-1,3-oxazolidine compound. Another example is a hydrogenated XDI of the formula

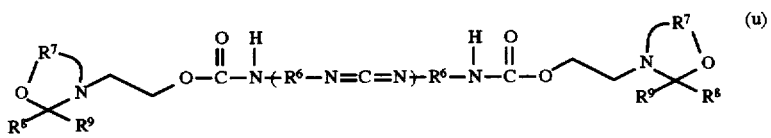

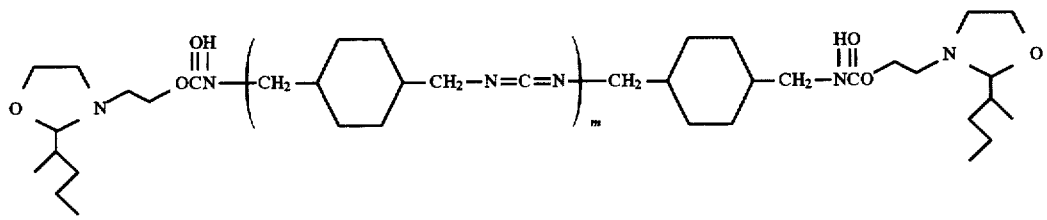

Further examples include MDI derived polycarbodiimides (modified HDI) terminally hindered with N-hydroxy-1,3-oxazolidine compound and those of the formulae ($H_{12}$MDI) and xylylenediisocyanate (XDI). These diisocyanates are more readily reactive with moisture and carboxy-

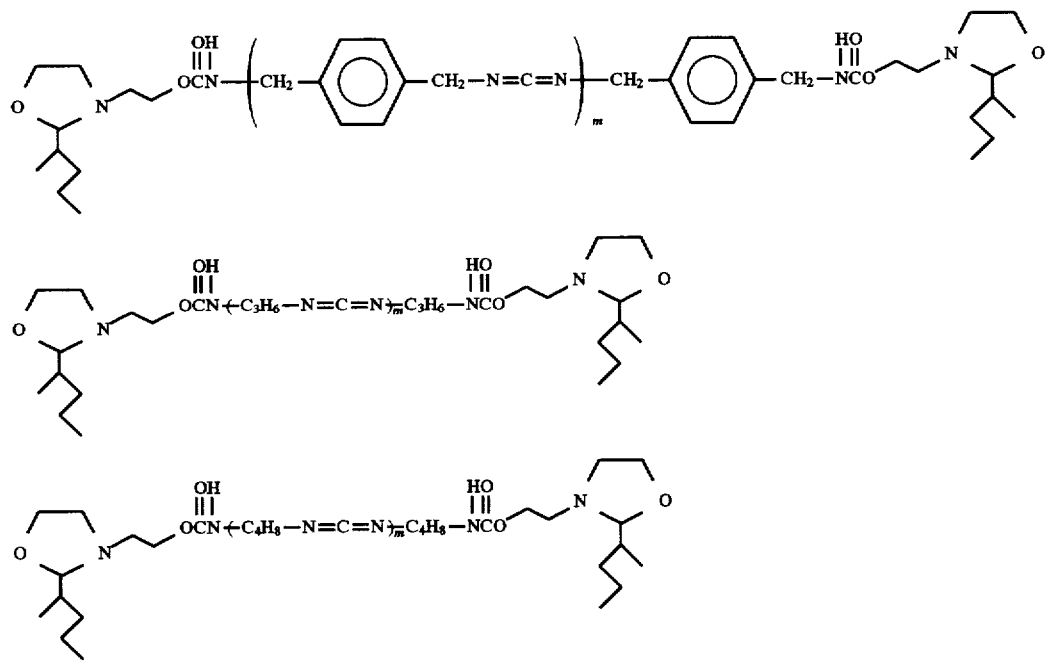

(wherein m is an integer of 1–20). Modified hydrogenated MDI and modified hydrogenated XDI are particularly preferred.

There is no particular restriction upon the manner of preparing bis-oxasolidine polycarbodiimide compounds according to the invention. They may be prepared by i) reacting an aliphatic diisocyanate with a carbodiimide at elevated temperature or in the presence of a catalyst such as 3-methyl-1-phenyl-2-phosphoren-1-oxide at room temperature and by ii) reacting the resulting polycarbodiimide compound with a N-hydroxyalkyl-1,3-oxazolidine compound of the formula

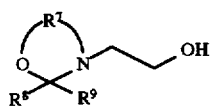

(v)

(wherein $R^7$, $R^8$ and $R^9$ are the same as $R^7$, $R^8$ and $R^9$ in formula (u), the reaction being effected such that the isocyanate groups in the polycarbodiimide compound become equivalent with the oxazolidine compound.

The aliphatic diisocyanate used in the above reaction exemplarily includes hexamethylenediisocyanate (HDI), isophoronediisocyanate (IPDI), hydrogenation MDI lic compounds than are aromatic diisocyanates, leading to improved storage stability.

The N-hydroxyalkyl-1,3-oxazolidine compound used in the reaction may be a N-hydroxyethyl-2-(1-methylbutyl)-1,3-oxazolidine of the formula

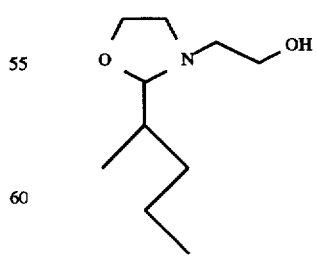

or a N-hydroxyethyl-2-phenyl-1,3-oxazolidine of the formula

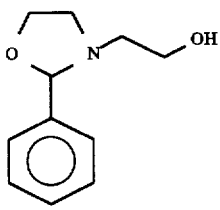

The bis-oxazolidine polycarbodiimide compound is used in an amount of 0.1–10.0, preferably 0.3–3.0 parts by weight per 100 parts by weight of Component (A). Departures from this range would result in deteriorated storage stability.

The inventive composition may be blended, if necessary, with fillers, plasticizers, pigments, charge inhibitors, flame retardants, thixotropic agents, silane coupling agents, dispersants, oxidation inhibitors, solvents and the like. The fillers may be calcium carbonate, carbon black, clay, talc, titanium oxide, quick lime, kaolin, zeolite, diatomaceous earth, vinyl chloride poaste resin, glass balloon and vinylidene chloride resin balloon. These may be used singly or in combination. There may be used solvents for the inventive compositions such as preferably aromatic solvents like xylene and toluene. The plasticizers include dioctyl phthalate (DOP), dibutyl phthalate (DBP), dilauryl phthalate (DLP), dibutylbenzyl phthalate (BBP), dioctyl adipate, diisodecyl adipate, trioctyl phosphate, tris(chyloroethyl) phosphate, tris(dichloropropyl)phosphate, propyleneglycolpolyester adipate, butyleneglycolpolyester adipate, alkyl epoxystearate and epoxidized soybean oil. These may be used singly or in combination. The pigments may be organic pigment such as azo-pigment and copper-phthalocyanine pigment or some other inorganic pigments. The thixotropic agents may be Aerosol (Nippon Aerosol Co.), Disparlon (Kusumoto Kasei Co.) or the like. The charge inhibitors may be an ionic compound such as quarternary ammonium salt and amine or hydrophilic compound such as polyethyleneglycol and ethylene oxide derivatives. There may be used adhesive improvers such as terpene resin, phenolic resin, terpene phenol resin, rosin resin and xylene resin. The flame retardants may be chloroalkyl phosphate, dimethylmethyl phosphonate, bromine, phosphorus compounds, ammonium polyphosphate, diethylbishydroxyethylamino phosphate or the like.

There is no particular restriction imposed upon the method of preparing the inventive one-pack urethane-based adhesive compositions. The various components may be added with suitable additives as required and should preferably be sufficiently kneaded and uniformly dispersed in vacuum or in inert gas atmosphere.

Preferred formulations of the inventive composition are as follows:

Formulation [1]: 100 weight parts Component (A), 0.1–20 weight parts Component (B) and 0.1–5.0 weight parts Component (C); i.e. at least one of Group (e)–(g) compounds.

Formulation [2]: 100 weight parts Component (A), 0.1–20 weight parts Component (B), 0.1–5.0 weight parts Component (C) and 0.1–2.5 weight parts Component (D).

In Formulation [2] above, Group (e) compounds of Component (C) are preferably used to ensure storage stability without affecting the curing property.

The invention will be further described by way of the following examples which should not be regarded as limiting the scope of the invention.

Inventive Examples 1-1–1-7 and Comparative Examples 1-1–1-4
(Synthesis of Potential Curing Agent I)

A one-liter three-necked flask was charged with 100.1 g diethanol amine and 100 ml benzene, followed by addition in droplets of 100.2 g 2-methylpentanol. The flask was then immersed in an oil bath, and the reaction admixture was allowed to react for 8 hours under reflux condition. Benzene was removed from the admixture thereby providing 187 g N-hydroxyethyl-2-(1-methylbutyl)-1,3-oxazolidine. 100 g of the resulting 2-(1-methylbutyl)-3-oxazolidine ethanol were mixed at room temperature with 51.5 g xylylene diisocyanate and allowed to react at 50° C. for one hour and at 80° C. for 8 hours. The yield was 151 g.

(Potential Curing Agent II)

Esteroxazolidine, tradenamed Hardener OZ by Bayer.

(Base Resin Preparation)

A reactor was charged with 57 weight parts polyoxypropylene triol (manufactured by Asahi Glass Co.) having three hydroxyl groups and an average modular weight of 5,000 and 23 weight parts polypropylene ether diol (manufactured by Sanyo Chemicals Co.) having two hydroxyl groups and an average molecular weight of 2,000, the admixture being subjected to dehydration at 110° C. and 50 mmHg for 2 hours. The reaction product was cooled to 80° C. and added under stirring with a mixture of 9.1 weight parts 2,4-tolylene diisocyanate (2,4-TDI) and 2,6-tolylene diisocyanate (2,6-TDI), the ratio being 2,4-TDI/2,6-TDI=80/20. The reaction was continued until the level of free isocyanates was reduced to 2.2%. There was obtained a polyurethane prepolymer TDE having 1.4% of terminal isocyanate groups. The TDI prepolymer was added with 19.6 weight parts diphenylmethane-4,4'-diisocyanate (MDI manufactured by MD Chemicals Co.) and stirred, followed by addition of 85 weight parts dehydrated polyoxypropylene triol (Mw=5,000) and 35 weight parts polypropylene ether diol (Mw=2,000). The reaction was continued at 80° C. until the level of free isocyanates was reduced to 1.8%. There was obtained urethane prepolymer MDI composition. 100 weight parts of this composition were taken into a dry nitrogen gas sealed kneader, followed by addition of 120 weight parts heavy calcium carbonate (Super 1500 of Maruo Calcium Co.) as a filler, 10 weight parts Aerosil 200 (manufactured by Nippon Aerosil Co.) as a hydrophilic silica, 40 weight parts dioctylphthalate (DOP) of Mitsubishi Chemicals Vinyl Co. as a plasticizer, 1 weight part of A-187 (manufactured by Nippon Unicar Co.) as a silane coupling agent and 17 weight parts xylene (of Kanto Chemicals Co.) as a solvent. The whole was sufficiently kneaded in a vacuum stirrer to provide a master batch resin.

Methylorthoformate: $HC(OMe)_3$ organosilicic acid ester: Kf-910 of Shinetsu Chemicals Co.

Ad-Ti: Additive Ti (P-toluene sulfonyl isocyanate) of Sumitomo Bayer Urethane Co.

Carbodiimide: Dicyclohexyl carbodiimide (DDC) of formula (s)

(Preparation of Hydrogenated MDI Modified Polycarbodimiide Compound)

100 weight parts hydrogenated MDI (Dismodule W of Bayer) was stirred and dissolved in 25 weight parts xylene, followed by addition of 0.75 g tetraisopropoxytitanium as a carbodiimidation catalyst (TPT-100 of Nippon Soda Co.). The admixture was refluxed at 120° C. for 15 hours, until isocyanate contents became 4.2%. Upon cooling and addition of additional 75 weight parts xylene, there was obtained a polycarbodiimide compound (CIHM).

The above various components were kneaded in predetermined amounts to provide one-pack urethane compositions shown in Table 1. Each urethane composition was measured for initial viscosity immediately upon kneading and for viscosity (storage stability) after being disposed at 60° C. for 3 days. Type-B viscosimeter was used. Each urethane composition was coated over a sheet of glass, and a tack-free time (T.F.T=curing speed) was measured at 20° C. and a relative humidity of 65% for a sheet of polyethylenephthalate to take until it is free of tack with respect to the urethane composition with the results also shown in Table 1.

TABLE 1-1

| | Inventive Examples | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| urethane prepolymer | 100 | 100 | 100 | 100 | 100 | 100 | 100 | 100 | 100 | 100 | 100 | 100 |
| heavy calcium carbonate | 120 | 120 | 120 | 120 | 120 | 120 | 120 | 120 | 120 | 120 | 120 | 120 |
| Aerosil 200 | 10 | 10 | 10 | 10 | 10 | 10 | 10 | 10 | 10 | 10 | 10 | 10 |
| A187 | 1 | 1 | 1 | 1 | 1 | 1 | 1 | 1 | 1 | 1 | 1 | 1 |
| DOP | 40 | 40 | 40 | 40 | 40 | 40 | 40 | 40 | 40 | 40 | 40 | 40 |
| xylene | 17 | 17 | 17 | 17 | 17 | 17 | 17 | 17 | 17 | 17 | 17 | 17 |
| Potential curing agent | | | | | | | | | | | | |
| I | 5 | 5 | 5 | 5 | 5 | 5 | 5 | 5 | | | | |
| II | | | | | | | | | 5 | 5 | 5 | |
| methylorthoformate | 2 | 2 | | | 1 | 1 | | | 2 | 1 | | |
| organosilicic acid ester | | | 2 | 2 | 1 | 1 | | 2 | | 1 | | 2 |
| Ad—Ti/methyl-orthoformate | | | | | | | 0.5/2 | 0.5/2 | | | 0.5/2 | 0.5/2 |
| DCC | — | 1 | — | 1 | 1 | | — | 1 | 1 | | — | 1 |
| CIHM | | | | | | 1 | | | | 1 | | |
| 2-ethylhexanoic acid | — | — | — | — | — | — | — | — | — | — | — | — |
| curability | 90 | 100 | 110 | 110 | 100 | 100 | 60 | 70 | 110 | 110 | 70 | 80 |
| T.F.T. (20° C.) storage stability | | | | | | | | | | | | |
| initial vis. (Ps) | 45,000 | 46,000 | 49,000 | 48,000 | 47,000 | 47,000 | 48,000 | 47,500 | 48,500 | 48,000 | 47,500 | 48,000 |
| vis. at 60° C after 3 days (Ps) | 75,000 | 65,000 | 60,000 | 60,000 | 60,000 | 70,000 | 70,000 | 65,000 | 70,000 | 75,000 | 75,000 | 75,000 |

TABLE 1-2

| | Comparative Examples | | | |
|---|---|---|---|---|
| | 1-1 | 1-2 | 1-3 | 1-4 |
| urethane prepolymer | 100 | 100 | 100 | 100 |
| heavy calcium carbonate | 120 | 120 | 120 | 120 |
| Aerosil 200 | 10 | 10 | 10 | 10 |
| A187 | 1 | 1 | 1 | 1 |
| DOP | 40 | 40 | 40 | 40 |
| xylene | 17 | 17 | 17 | 17 |
| Potential curing agent | | | | |
| I | 0 | 5 | | 5 |
| II | 0 | | 5 | |
| methylorthoformate | — | — | — | — |
| organosilicic acid ester | | | | |
| Ad—Ti/methyl-orthoformate | | | | |
| DCC | — | — | — | — |
| CIHM | | | | |
| 2-ethylhexanoic acid | — | — | — | 2 |
| curability | 400 | 180 | 210 | 60 |
| T.F.T. (20° C.) storage stability | | | | |
| initial vis. (Ps) | 45,000 | 45,000 | 46,000 | 46,500 |
| vis. at 60° C. after 3 days (Ps) | 65,000 | 90,000 | 110,000 | solidified |

Inventive Examples 2-1-2-7
[Synthesis of Urethane Prepolymer (2-a)]

An admixture of 850 g polypropylene glycol having a number-average molecular weight of 3,000, 150 g polypropylene triol having a number average molecular weight of 3,000 and 300 g dioctylphthalate was added with 134 g diphenylmethane diisocyanate. The whole was allowed to react with stirring at 80° C. for 10 hours, until there was obtained a urethane prepolymer (2-a) containing 1.1% isocyanate group.

[Synthesis of Urethane Prepolymer (2-b)]

The above synthesized prepolymer (2-a) was further added with 7.0 g hydroxyalkyl oxazolidine (2) and reacted at 80° C. for 8 hours, thereby providing a urethane prepolymer (2-b) containing a part of oxazolidine terminal groups.

Urethane prepolymers (2-a) and (2-b) each were added with an oxazolidine component, p-toluene sulfonylsiocyanate, oxygen-containing organic compound and other additives in this order that are shown in Table 2 and sufficiently kneaded to provide respective compositions. Each composition was measured by Type-B Viscosimeter for initial viscosity and viscosity after being disposed at 70°

C. for 24 hours. A sample composition is formed into a sheet measuring 100 mm long, 100 mm wide and 5 mm thick and checked for tack-free time (minutes) which was a length of time consumed until the fingers ceased to stick to the sheet, with the results shown in Table 2-1.

Comparative Examples 2-1–2-6

The procedure of Inventive Example 2-1 was followed except for the use of different components as shown in Table 2-2.

pylene trial having a number-average molecular weight of 3,000 and 300 g dioctylphthalate was added with 124 g diphenylmethane diisocyanate. The whole was reacted with stirring at 80° C. for 10 hours. There was obtained a urethane prepolymer (3-a) having 0.7% isocyanate contents.

The prepolymers (3-a) were kneaded with components shown in Table 3 to provide respective compositions. Each

TABLE 2-1

|  | Inventive Examples | | | | | | |
|---|---|---|---|---|---|---|---|
|  | 2-1 | 2-2 | 2-3 | 2-4 | 2-5 | 2-6 | 2-7 |
| urethane prepolymer (2-a) | 100 | 100 | 100 | 100 | 100 | 100 | |
| urethane prepolymer (2-b) | | | | | | | 100 |
| heavy calcium carbonate *1 | 120 | 120 | 120 | 120 | 120 | 120 | 120 |
| hydrophilic silica *2 | 10 | 10 | 10 | 10 | 10 | 10 | 10 |
| dioctylphthalate | 20 | 20 | 20 | 20 | 20 | 20 | |
| bis-oxazolidine *3 | 7 | 7 | 7 | 7 | 7 | | |
| oxazolidine silyether *4 | | | | | | 10.0 | |
| p-toluene sulfonyl isocyanate *5 | 1.0 | 1.0 | 1.0 | 1.0 | 1.0 | 1.0 | 5.0 |
| methyl formate | 1.0 | | | | | 1.0 | 5.0 |
| methyl acetate | | 1.0 | | | | | |
| 2-ethyl hexanoic acid | | | 1.0 | | | | |
| butylglycidyl ether | | | | 1.0 | | | |
| tetrahydrothiophene | | | | | 1.0 | | |
| initial vis 20° C. (Ps) | 55,000 | 55,000 | 58,000 | 50,000 | 54,000 | 60,000 | 62,000 |
| vis. at 70° C. after 1 day 20° C. (Ps) | 68,000 | 65,000 | 65,000 | 55,000 | 59,000 | 67,000 | 70,000 |
| tack-free time (min.) | 10 | 20 | 25 | 180 | 180 | 15 | 150 |

TABLE 2-2

|  | Comparative Examples | | | | | |
|---|---|---|---|---|---|---|
|  | 2-1 | 2-2 | 2-3 | 2-4 | 2-5 | 2-6 |
| urethane prepolymer (2-a) | 100 | 100 | 100 | 100 | 100 | 100 |
| heavy calcium carbonate *1 | 120 | 120 | 120 | 120 | 120 | 120 |
| hydrophilic silica *2 | 10 | 10 | 10 | 10 | 10 | 10 |
| dioctylphthalate | 20 | 20 | 20 | 20 | 20 | 20 |
| bis-oxazolidine *3 | | 7 | | | | 7 |
| diazabicyclooctane | | | 0.01 | | | |
| tris(dimethylaminomethyl)-phenol | — | — | | 0.5 | | |
| dibutyltin dilaurate | | | | | 0.1 | |
| 2-ethyl hexanoic acid | | | | | | 1 |
| initial vis. 20° C. (Ps) | 50,000 | 55,000 | 70,000 | 61,000 | 70,000 | 56,000 |
| vis. at 70° C. after 1 day 20° C. (Ps) | 55,000 | 100,000 | solidified | solidified | solidified | 120,000 |
| tack-free time | 8 hr | 180 min | 5 min | 20 min | 10 min | 3 hr |

(Notes to Table 2)
*1 Super 1500 of Maruo Calcium Co.
*2 Aerosil 200 of Nippon Aerosil Co.
*3 Hardener OZ of Sumitomo Bayer Urethane
*4 Oxazolidine silyether (silicon III)
This ether corresponds to oxazolidine silyether of formula 3 above. It was prepared by reacting a mixture of 100 g 2-(2-methylbutyl)-3-(2-hydroxyethyl) oxazolidine, 32.7 g tetraethoxysilane, 50 g toluene and 0.5 g 50% xylene solution of titanium tetraisopropoxide. The admixture was reacted at 80° C. for 2 hours and at 140° C. for 3 hours while by-produced ethanol was treated azeotropically with toluene. Unreacted products and toluene were removed in vacuum. The resulting product was analyzed by infrared spectrum to ascertain freedom of hydroxyl groups and by $^1$HNMR to ascertain freedom of ethoxy groups.
*5 Additive Ti of Sumitomo Bayer Urethane Co.

Inventive Examples 3-1–3-6 and Comparative Examples 3-1–3-3

An admixture of 850 g polypropylene glycol having a number-average molecular weight of 3,000, 150 g polyprocomposition was measured by Type-B viscosimeter for viscosity after being disposed at 50° C. for 7 days. A sheet of 100 mm×100 mm×5 mm was formed from each composition and measured for tack-free time (minutes) with the results shown in Table 3.

TABLE 3

| | Inventive Example | | | | | | Comparative Example | | |
|---|---|---|---|---|---|---|---|---|---|
| | 3-1 | 3-2 | 3-3 | 3-4 | 3-5 | 3-6 | 3-1 | 3-2 | 3-3 |
| Component (A), base resin | | | | | | | | | |
| urethane prepolymer | 100 | 100 | 100 | 100 | 100 | 100 | 100 | 100 | 100 |
| carbonblack | 100 | 100 | 100 | 100 | 100 | 100 | 100 | 100 | 100 |
| dioctylphthalate | 20 | 20 | 20 | 20 | 20 | 20 | 20 | 20 | 20 |
| xylene | 10 | 10 | 10 | 10 | 10 | 10 | 10 | 10 | 10 |
| Component (B) | | | | | | | | | |
| esteroxazolidine | 5 | 5 | 5 | 5 | 5 | 5 | 0 | 5 | 5 |
| Component (C) | | | | | | | | | |
| methylorthoformate | 3 | | | | | | | | |
| organosilicic acid ester | | 2 | 2 | | | | | | |
| additive Ti/methylorthoformate | | | | 0.5/2 | 0.5/2 | 0.5/2 | | | |
| organobismuth compound | | | | | | 0.1 | | | |
| Component (D) | | | | | | | | | |
| carbodiimide compound | | 1.5 | | | 1.5 | 1.5 | | | |
| Other additive | | | | | | | | | |
| 2-ethylhexanoic acid | | | | | | | | | 1 |
| Evaluations | | | | | | | | | |
| tack-free time (min.) | 90 | 90 | 90 | 40 | 40 | 20 | 480 | 240 | 60 |
| initial vis. (Ps) | 100 | 110 | 110 | 115 | 120 | 120 | 100 | 100 | 120 |
| vis. at 50° C. after 7 days (Ps) | 280 | 200 | 150 | 210 | 150 | 200 | 140 | 210 | X |

Components
carbonblack: Asahi Thermal 7, Asahi Carbon Co.
dioctylphthalate: Diasizer DOP of Mitsubishi Chemicals Co.
esteroxazolidine: Hardener OZ of Bayer (counterpart of formula (2)
organosilicic acid ester: KF 910 of Shinetsu Chemicals Co. (p-toluene sulfonyl isocyanate)
organobismuth compound: Coscat #83 of Nitto Chemicals Co.
carbodiimide compound: DCC reagent
2-ethylhexanoic acid: reagent The inventive moisture-curable polyurethane resin composition is highly curable, stable in storage and free from foaming when curing. It is also free of malodor or corrosion which could otherwise take place as in the use of hydrogen chloride as a curing accelerator. There is a wide variety of application available by selecting or combining suitable ring-opening promoters for oxazolidine rings.

What is claimed is:

1. A room temperature curing polyurethane composition which comprises a polyisocyanate compound or polyurethane prepolymer (A), an oxazolidine compound (B) having at least one oxazolidine ring and a compound (C) effective upon contact with water for accelerating the opening of the oxazolidine ring, said compound (C) being one or more compounds selected from the group consisting of (i) an organic silicic acid ester (ii) a mixture or adduct of a p-toluenesulfonyl isocyanate and another oxygen-containing or sulfur-containing organic compound, said oxygen-containing organic compound having one or more oxygen atoms in the form of ether or ester bonding, and said sulfur-containing organic compound having one or more sulfur atoms in the form of sulfide bonding and (iii) mixtures of (i) and (ii).

2. A room temperature curing polyurethane composition which comprises a polyisocyanate compound or polyurethane prepolymer (A), an oxazolidine compound (B) having at least one oxazolidine ring, a compound (C) effective upon contact with water for accelerating the opening of the oxazolidine ring, said compound (C) being one or more compounds selected from the group consisting of (i) an organic silicic acid ester, (ii) a mixture or adduct of a p-toluenesulfonyl isocyanate and another oxygen-containing or sulfur-containing organic compound, said oxygen-containing organic compound having one or more oxygen atoms in the form of ether or ester bonding, and said sulfur-containing organic compound having one or more sulfur atoms in the form of sulfide bonding and (iii) mixtures of (i) and (ii); and a carbodiimide compound (D).

3. A room temperature curing polyurethane composition as defined in claim 1 or claim 2 wherein said component (B) is a product of the reaction between a polyisocyanate compound or a urethane prepolymer of an organic isocyanate and a polyol, and an N-hydroxyalkyl oxazolidine.

4. A room temperature curing polyurethane composition as defined in claim 1 or claim 2 wherein said component (C) is an organic silicic acid ester.

5. A room temperature curing polyurethane composition as defined in claim 1 or claim 2 wherein said component (C) is said mixture or adduct of p-toluenesulfonyl isocyanate and another oxygen-containing organic compound or sulfur-containing organic compound.

* * * * *